United States Patent Office 3,548,277
Patented Dec. 15, 1970

3,548,277
THREE-PHASE ASYNCHRONOUS ELECTRIC MOTOR
Alexandr Arsenievich Voitekh, Bulvar Lenina 19, kv. 24, and Erikh Viktorovich Lir, Ulitsa Ezhena Potie 9, kv. 56, both of Kiev, U.S.S.R.
Filed Apr. 4, 1968, Ser. No. 718,729
Int. Cl. H02k 17/14
U.S. Cl. 318—224       3 Claims

ABSTRACT OF THE DISCLOSURE

A three-phase asynchronous electric motor, the speed of which is controlled by varying the amplitudes of magnetic fields having a different number of pairs of poles rotating in one and the same direction. The electric motor is provided with a special winding on the stator which includes a bridge circuit having diagonal branch points constituting input terminals for different numbers of pairs of poles of the winding which creates two magnetic fields rotating in one and the same direction when said winding is fed from one system of three-phase voltage. The speed of the electric motor is controlled by varying voltage values applied to diagonal knot points.

---

The present invention relates to three-phase asynchronous electric motors provided with stepless speed control that is brought about by varying the amplitude of two magnetic fields rotating in one and the same direction and having a different number of pairs of poles.

Known in the art are asynchronous electric motors controlled by varying the amplitudes of two magnetic fields rotating in one and same direction and having a different number of pole pairs, wherein the stator is fitted with two separate windings the number of pole pairs of which is equal to that of the pole pairs of the rotating magnetic fields. Independent control of the magnetic field amplitudes is achieved by varying the value of the voltages applied to the stator windings.

An inherent disadvantage of known electric motors is the inefficient utilization of their active materials because of the employment of two separate windings.

A primary object of the present invention is to eliminate said disadvantage.

A further object is to provide an asynchronous electric motor that insures speed control by variation of the amplitudes of two magnetic fields rotating in one and the same direction, insures independent control of the amplitudes of the above-mentioned magnetic fields, and efficient utilization of the active materials of the motor.

In accordance with the present invention, these objects are attained by the development of an induction motor having a single stator winding each phase of which includes four branches constituting a bridge circuit that is connected by its diagonal branch points to the supply mains through control devices and providing a different number of pole pairs with respect to different diagonal branch points, the winding branches constituting the bridge arms included in one of the phases of series-connected neighboring coils, whereas those of the other two phases include two series-connected coil groups' the number of coils in one of which is twice that in the second group that are shifted by 135 electrical degrees with respect to the field having the smaller number of pole pairs.

It is expedient to divide each phase of the winding into several identical bridge branches that are connected in series by the diagonal branch points corresponding to the greater number of pole pairs and in parallel by the diagonal branch points corresponding to the smaller number of pole pairs.

The invention proposed herein will further be described by way of example with reference to the accompanying drawings, wherein.

Each stator winding phase A, B, C (FIG. 1) of the speed-controlled motor constitutes a bridge circuit. The stator winding has a $P_1$ number of pole pairs with respect to diagonal branch points 1 and 3 of phases A, B, C and a $P_2$ number of pole pairs with respect to diagonal branch points 2 and 4. The stator winding is connected to the A.C. supply mains by points 1 and 3, 2 and 4 of phases A, B, C through control elements 5–8 (for example, magnetic amplifiers or controlled valves). The speed of the electric motor is controlled by varying the value of the voltage applied to the diagonal branch points of the bridge circuit. This is achieved by making use of control elements 5–8.

The magnetic fields rotate in one and the same direction at supply of diagonal branch points 1 and 3, 2 and 4 of the stator winding phases A, B, C from one system of voltages.

Rotation of the magnetic fields in one and the same direction is brought about by grouping the stator winding branch coils in a specific manner.

Figure 2:
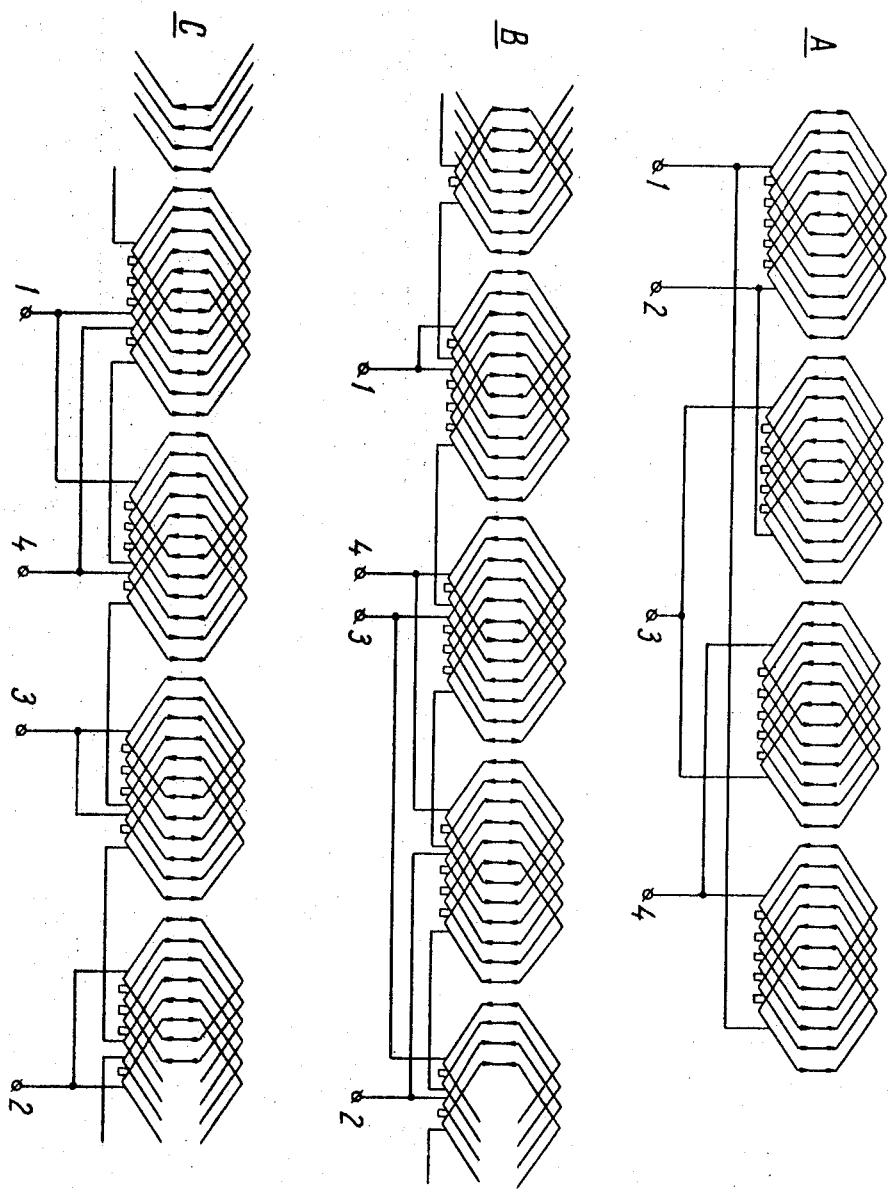
FIG. 2 shows the elementary circuit diagram of the stator winding.

FIG. 2 shows the elementary circuit diagram of the winding branches at $P_1:P_2=4:8$.

The phase A branches 1–2, 2–3, 3–4, 4–1 of the winding include six series connected neighboring coils.

The phase B and C branches 1–2, 2–3, 3–4 and 4–1 of the winding are built up of two coil groups, one of the latter containing four coils and the other containing two coils. The coil groups are spaced 135 electrical degrees apart with respect to the field having the smaller number of pole pairs.

Figure 1:
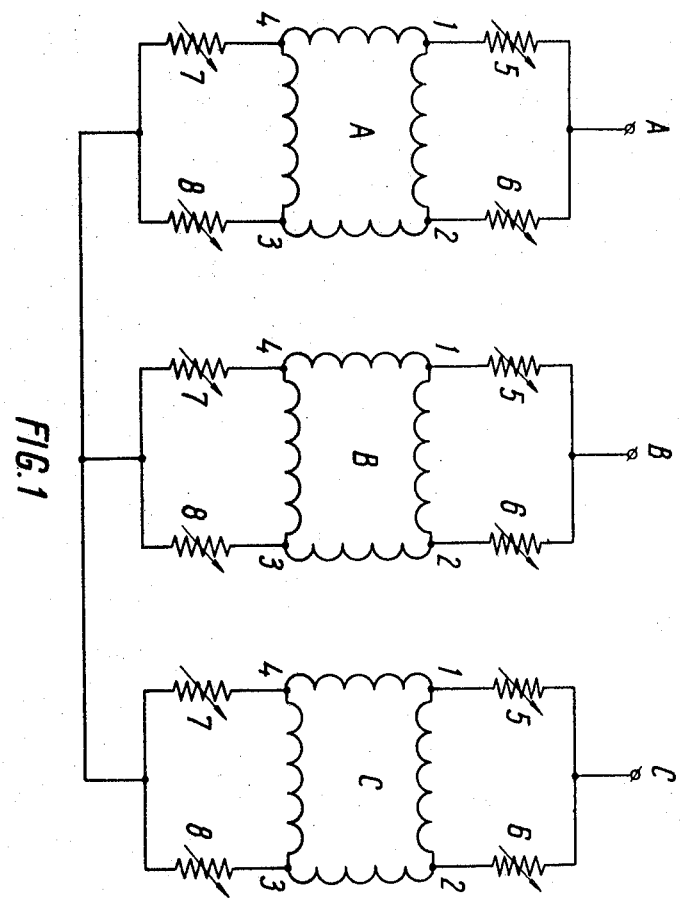
FIG. 1 shows the interconnecting diagram of the herein proposed electric motor and the supply mains in accordance with the present invention.
Figure 3:
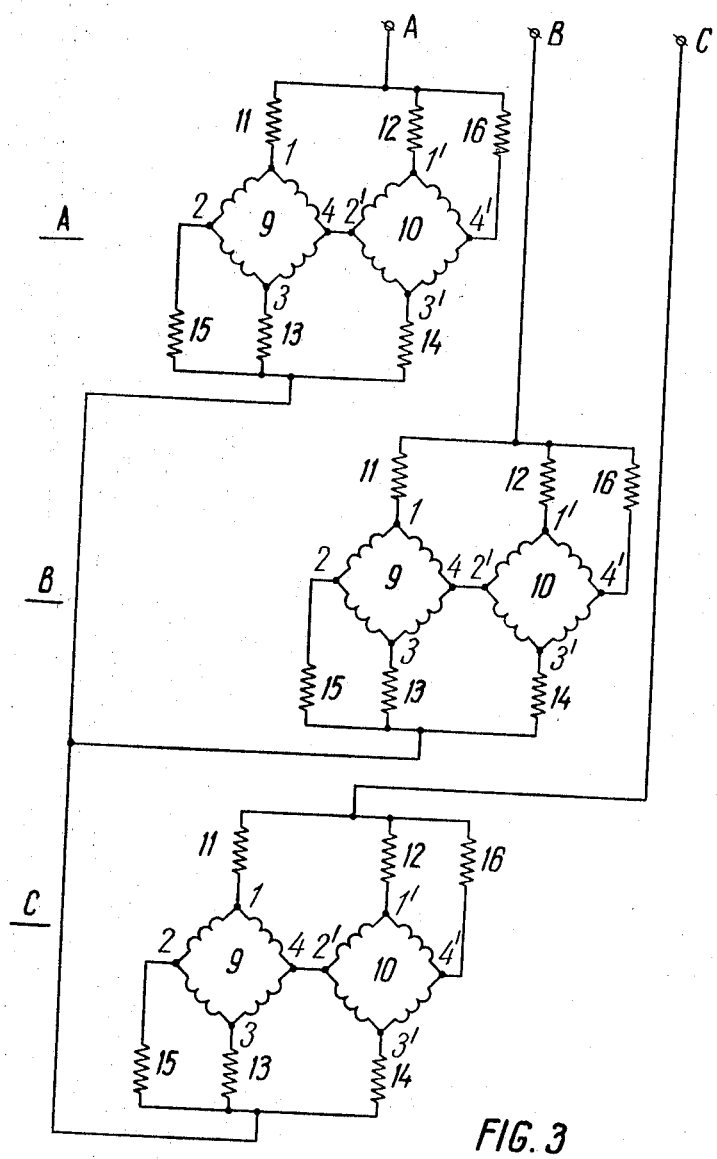
FIG. 3 shows the connection diagram of the stator winding sections wherein the bridge circuits are divided into identical parallel branches.

At employment of the interconnecting diagram shown in FIG. 1, a part of the supply mains voltage of one of the number of pole pairs is suppressed by the control elements because of the constant number of effective phase turns for each number of pole pairs. In order to match the winding and mains voltages and to reduce the installed capacity of the control devices, each phase of the stator winding can be divided into several similar bridge branches arranged in the same slots and connected as shown in FIG. 3 (branches 9, 10 connected to phase A, branches 9, 10 connected to phase B and branches 9, 10 to phase C).

Generally, it is expedient to make the number of winding bridge branches equal to the ratio of the number of pole pairs of the rotating magnetic fields.

The bridge branches are connected in series by the diagonal branch points that correspond to the greater number of poles and in parallel by the diagonal branch points that correspond to the smaller number of pole pairs.

The amplitudes of the field having the smaller number of pole pairs is controlled by means of control elements 11–14 of phases A, B, C and the amplitudes of the field having the greater number of pole pairs by means of control elements 15–16.

In cases when magnetic amplifiers serve as control elements, elements 11–14 may be incorporated in a single three-phase magnetic amplifier, and elements 15 and 16 in another three-phase magnetic amplifier.

What we claim is:

1. A three-phase asynchronous electric motor comprising a three-phase stator winding means including in each phase a bridge circuit constituted by a first, second, third and fourth branch, and a first, second, third and fourth diagonal point, said first and second branches being coupled to one another at said first diagonal point, said second and third branches being coupled to one another at said second diagonal point, said third and fourth branches being coupled to one another at said third diagonal point, said fourth and first branches being coupled to one another at said fourth diagonal point, a first, second, third and fourth control means coupled one with each said first, second, third and fourth diagonal point respectively, circuit means for coupling said first and second control means with one another, circuit means for coupling said third and fourth control means with one another, circuit means for coupling said third and fourth control means in each phase with said third and fourth control means in each other phase, and voltage supply means including a first, second and third group of coils connected to each phase respectively, each said group of coils having a number of coils relative to the number of coils in each other said group of coils in the ratio of 3:2:1, each said group of coils being shifted relative to one another by 135 electrical degrees.

2. A three-phase asynchronous electric motor as claimed in claim 1, wherein said first and third diagonal point constitute terminals for a prescribed number of pairs of poles, and said second and fourth diagonal point constitute terminals for a number of pairs of poles differing in number from said prescribed number of pairs of poles.

3. A three-phase asynchronous electric motor as claimed in claim 2, wherein said first and third diagonal point constitute terminals for a lesser number of pairs of poles than said second and fourth diagonal point, and further including control elements connected in series with said second and fourth diagonal point and further control elements connected in parallel with said first and third diagonal point.

References Cited

UNITED STATES PATENTS

| | | | |
|---|---|---|---|
| 2,900,587 | 8/1959 | Piquet | 318—224 |
| 3,233,159 | 2/1966 | Rawcliffe | 318—224 |

ORIS L. RADER, Primary Examiner

G. Z. RUBINSON, Assistant Examiner

U.S. Cl. X.R.

318—225